Sept. 16, 1958 S. RUHMAN 2,852,699

MAGNETIC CORE GATING CIRCUITS

Filed March 23, 1955 3 Sheets-Sheet 1

INVENTOR
SMIL RUHMAN
BY Elmer J. Gorn
ATTORNEY

MAGNETIC CORE GATING CIRCUITS

Filed March 23, 1955 3 Sheets-Sheet 2

INVENTOR
SMIL RUHMAN
BY Elmer J. Gorn
ATTORNEY

INVENTOR
SMIL RUHMAN
BY [signature]
ATTORNEY

United States Patent Office 2,852,699

Patented Sept. 16, 1958

2,852,699

MAGNETIC CORE GATING CIRCUITS

Smil Ruhman, Waltham, Mass., assignor to Raytheon Manufacturing Company, Waltham, Mass., a corporation of Delaware Application March 23, 1955, Serial No. 496,192

10 Claims. (Cl. 307—88)

This invention relates to intelligence control systems, and particularly to the storage and transmission of electrical energy representative of numerical digits to be counted or informational or logical components to be utilized in a computing operation or in a machine or apparatus for controlling functional sequences.

The invention is characterized by the application to one or more two-state elements of state-controlling circuitry functioning to produce predetermined reactions and operational patterns in said element or elements in accordance with the selection of one or another of alternative means made available for energization of said element or elements.

The invention is applicable to multi-stage computing or data-handling devices, among other uses, which devices may include, in each stage, one or more cores of ferromagnetic material having high magnetic retentivity and a relatively open hysteresis loop of nearly rectangular shape, so that when such a core is magnetized to a state of flux saturation of one polarity, it tends to remain in such state until the direction of flux saturation is reversed, as by application of a flux-reversing force in the form of a pulse of current delivered to a winding carried by the core. To such a known arrangement the present invention adds the concept of (*a*) simultaneously delivering two current pulses to two distinct and oppositely poled windings on each of two or more such cores, and (*b*) buffering the outputs of two or more such cores, thereby obtaining the "exclusive OR" logical result at a point of functional application of such result. An "exclusive OR" signal is applicable, for example, to indicate the partial sum or difference of two input signals which may arbitrarily be designated A and B, respectively. When applied to such a logical arrangement, the circuits herein disclosed will operate to produce, at an output point, a signal of significance . . . $(AvB)\cdot(\overline{A\cdot B})$ . . ., meaning "A or B, but not A and B." In this fashion, "exclusive OR" differs from a mere "OR" arrangement, which would not necessarily distinguish between "A or B," on the one hand, and "A and B," on the other.

These and other characteristics of the invention will be apparent as the description thereof progresses, reference being had to the accompanying drawings wherein:

Figs. 2, 4, 6, and 8 show four distinct systems of magnetic cores and inter-linking circuitry, each embodying the invention; and Figs. 1, 3, 5 and 7 are diagrams indicating the logical functions performed by the circuitry of Figs. 2, 4, 6 and 8, respectively.

Figure 1:
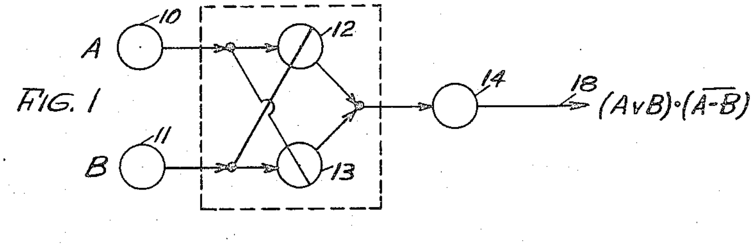
Figure 2:
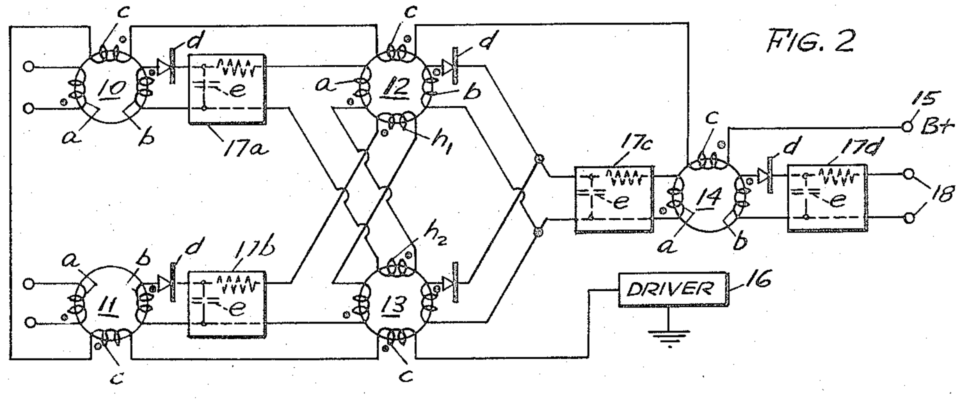

Refering first to Figs. 1 and 2, four ferromagnetic cores 10, 11, 12 and 13 are arranged in inter-linked pairs, with each pair being adapted to function as a pair of successive stages of a digital "shift register," or other data storage and transfer system, in which each core is capable of holding itself in a condition of magnetic flux saturation of such a polarity as to represent an arbitrarily assigned binary digital value.

Three basic windings, an input winding *a*, an output winding *b*, and a shift winding *c*, are carried by each core, and the shift windings of all the cores are arranged in series to form what has come to be known as a "shift line," to which core flux-reversing "shift" or "read-out" pulses are applied from a source 15 under the control of triggering pulses applied to a driver unit 16.

Saturation of a core in the direction of the field applied by the shift pulse has been arbitrarily agreed upon, as a conventional practice in the art, as representative of the "0" binary digital value, whereas saturation in the opposite direction is assumed to represent a "1" digital value; hence, application of a shift pulse clears all the cores (including the fifth core 14) to the "0" state, thus inducing a current-generating voltage in the output winding *b* of each core that has previously been in the "1" state. In this manner signals of "1" significance are transferred from each "1"-storing core to the following core, as a result of each shift pulse application.

To accomplish the "exclusive OR" result above described, cores 12 and 13 are provided with "inhibit" windings $h_1$ and $h_2$, respectively, whose polarity is opposite to that of input windings *a* of said cores (as indicated by the "dot" positioning adjacent thereto). When winding 12$h_1$ for example, receives energy from output winding 11*b* of core 11 (by way of unidirectional diode *d* and delay network 17*b*), signifying that a "B"-representing signal has just been transferred out of core 11, the said energy input to winding 12$h_1$ tends to cancel the effect of the "A" signal energy concurrently entering core 12 by way of input winding 12*a*. The result is that core 12 will remain in the "0"-representing state to which it had previously been shifted (by the effect of the shift pulse applied thereto in the preceding shift period). Thus there is, in effect, a selective suppression of the "A" signal that would normally have been transferred from core 10 to core 12 during the particular time interval of shift register operation under consideration, the normal transfer operation having been nullified, or inhibited, by the intervention of energy previously entered in core 11 by application of a pulse of "B" code significance to input winding 11*a*. In like manner the "B" signal entering core 13 is inhibited by the action of the "A" current entering winding 13$h_2$ from the output winding 10*b* of core 10 (via *d* and 17*a*). Thus the "A" and "B" signals simultaneously read out of cores 10 and 11, respectively, nullify each other in cores 12 and 13, and the result is an absence of signal transfer to core 14 when the next succeeding shift pulse is applied from source 15. Accordingly, one cycle later, there will be no energy flow to utilization point 18, and this absence of a signal pulse at point 18 will signify . . . $\overline{A\cdot B}$ . . ., that is, the negation of the combined entries A and B.

If, on the other hand, an "A" signal is entered in core 10, but no signal in core 11, for a given interval, the "A" signal will thereafter enter core 12 without inhibition by "B" energy, and such fact will subsequently be registered at point 18 as . . . $AvB$ . . ., that is, the receipt of a signal of "A" or "B" significance, uninhibited by a companion signal of opposite significance.

Figure 3:
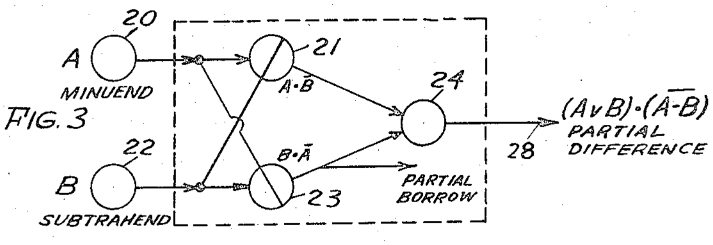
Figure 4:
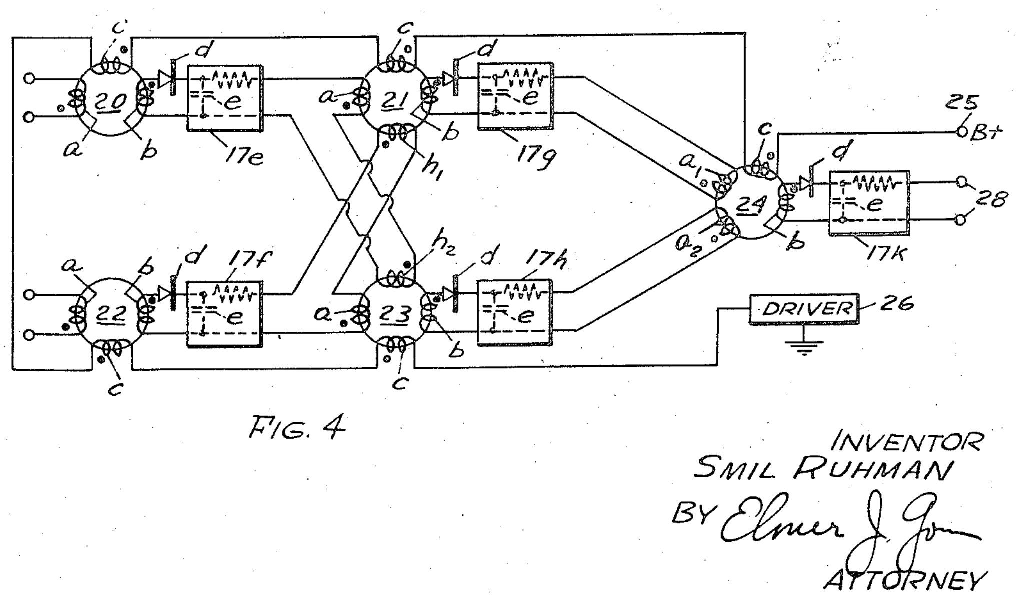

Figs. 3 and 4 show the invention applied to the logical operation of partial subtraction. The core circuitry in Fig. 4 is the same as in Fig. 2 except that the outputs of cores 21 and 23 are simultaneously mixed or buffered on core 24 by means of two separate or isolated input windings 24$a_1$ and 24$a_2$, which provide that the inputs to be mixed as well as the buffered output are available for use, the input to the latter winding 24$a_2$ being indicative of a "partial borrow $(B\cdot\overline{A})$" whenever the core 23 receives a "B," or "subtrahend" input at 23*a*, uninhibited by any concurrent "A," or "minuend" input at 23$h_2$. This condition exists when a digit in the subtrahend is a binary "1" and the corresponding digit in the minuend is a binary "0." The term partial borrow is used because it has not taken account of possible prior borrowing during the subtraction of preceding digits. The "partial difference" output at 28 in Fig. 3 or 4 (on those occasions when output occurs) will be the result of the prior entry, into core 21, of an "A" signal uninhibited by a "B" signal entry to winding $21h_1$, or it will be the result of the prior entry, into core 23, of a "B" signal uninhibited by an "A" signal entry to winding $23h_2$. Whenever both A and B inhibit each other, in the respective cores 23 and 21, there will be (in the following shift interval) no signal output at 28, thus indicating the absence of a partial difference at the entry points 20, 22.

Figures 5, 6, 7, 8:
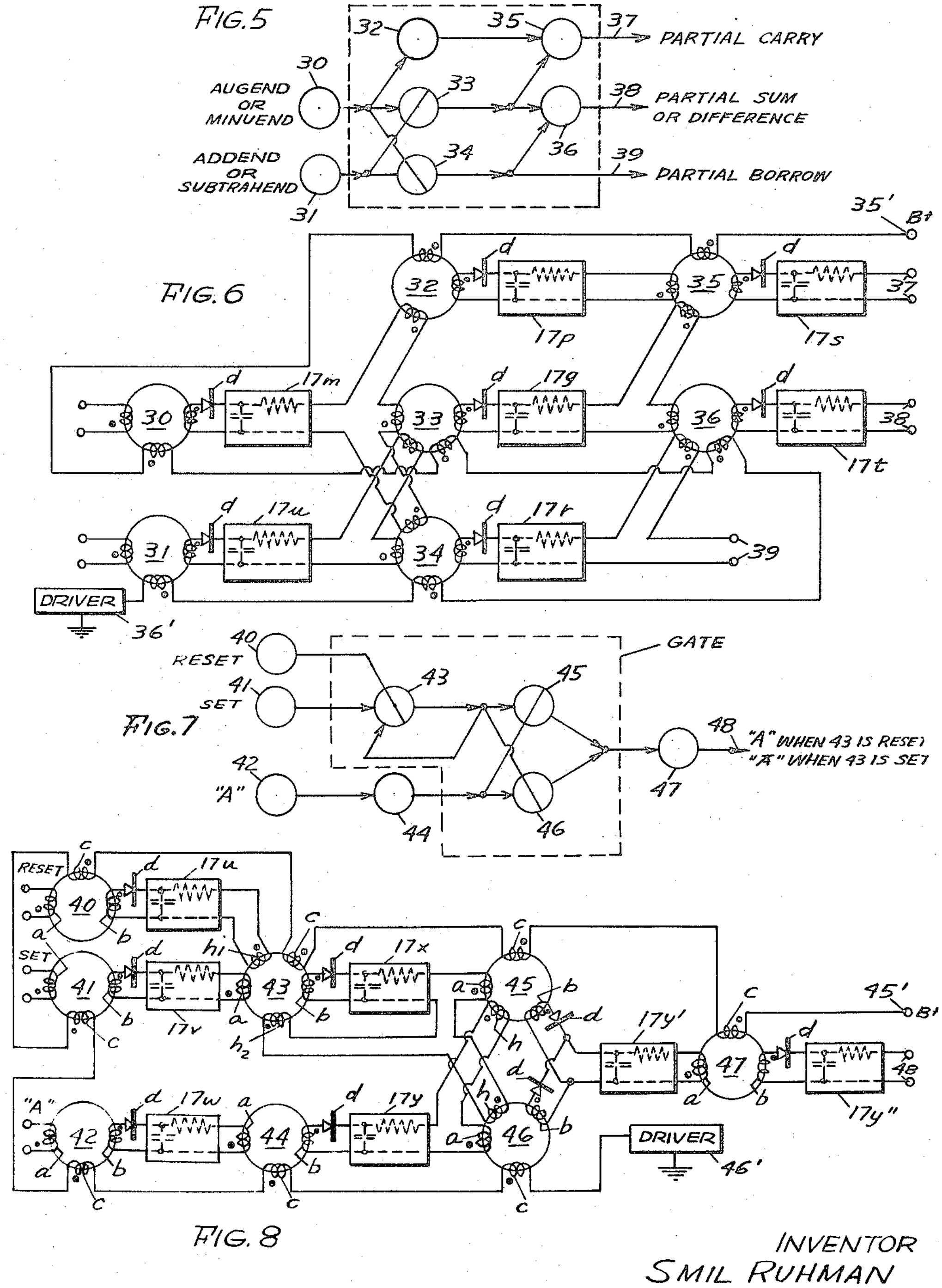

Figs. 5 and 6 show how a "partial carry" indication can be obtained as an added result, by enlarging the core arrangement of Figs. 3 and 4 to include two cores 32 and 35 in the output circuits of cores 30 and 33, respectively. All cores in the Fig. 6 circuitry will have shift windings *c*, unidirectional diodes *d*, and delay networks 17 in their respective output circuits, which components correspond to the similarly designated components of Figs. 2 and 4. In view of the "partial carry" capability incorporated in cores 32 and 35, the output at 38 of Figs. 5 and 6 will be useful as an indication of the "partial sum" of the inputs at cores 30 and 31, as well as the "partial difference."

Figs. 7 and 8 show a core arrangement involving incorporation of the capability of at least one core (core 43, as shown) having its output fed back into itself by way of an inhibit winding $43h_2$. The combination of this arrangement with the "exclusive OR" capabilities of cores 45 and 46 (corresponding in structure and mode of operation to cores 12 and 13, for example, of Fig. 2) produces a gating mechanism by means of which there is available at output point 48 (in Fig. 7 or Fig. 8) a train of information ("A") corresponding to that entered in core 42, when core 43 is "reset," and the complement ($\bar{A}$) of such information when core 43 is "set." "Set" occurs when there is an input to winding 43*a* from core 41, and "reset" occurs when there is an input to winding 43 from core 40.

Figure 9:
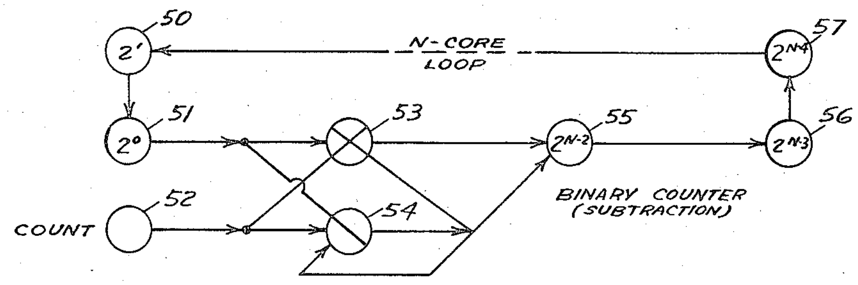
Figure 10:
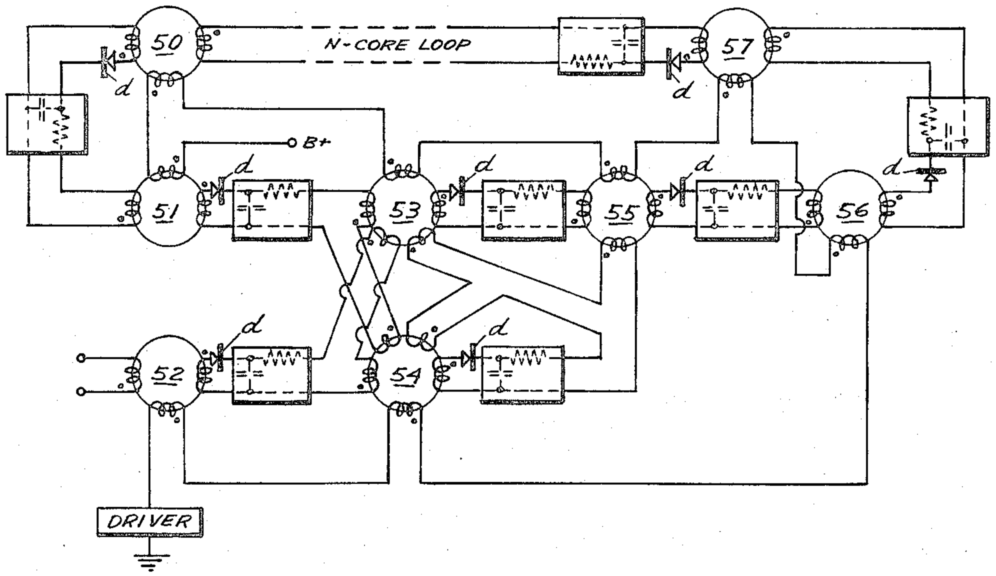

If it is desired to add or subtract a single digit from a number, the adder or subtracter may be simplified to the extent of removing the first half-adder or half-subtracter, such as the half-adder-subtracter core group enclosed within the broken rectangular line in Fig. 5. Such a "whole" adder or subtracter may be used in conjunction with an N-core loop to form a binary counter of capacity $2^n$, as shown in Figs. 9 and 10. The particular arrangement shown would accomplish subtraction. The register loop stores the count entered at core 52, after being initially cleared to the "1" state. Whenever a count pulse appears, it is subtracted from the stored content of the loop, which actually stores the complement of the true count. If desired, the true count can be made available by the addition of a conventional two-core complementing circuit. The "exclusive OR" cores 53 and 54, of course, correspond in structure and functioning to cores 11 and 13, for example, of Fig. 2.

In referring to a core as having "two distinct windings," one for inhibiting the other by reason of the opposite polarity of the current delivered thereto, it is to be understood that it is also contemplated that the same result may be accomplished by use of a single winding operable by two distinct conducting sources, in polar opposition.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. An "exclusive OR" logical device comprising a pair of field-sustaining elements, each having input, output and inhibit windings, a first input circuit including the input winding of the first field-sustaining element, a second input circuit including the input winding of the second field-sustaining element, and means for cross-connecting said second and first inhibit windings in series with said first and second input windings, respectively, to prevent any change in either of said field-sustaining elements when both said input circuits carry input current simultaneously.

2. An "exclusive OR" logical device for performing the function of partial subtraction comprising a pair of field-sustaining elements, each having input cancellation and output windings, a first circuit including the input winding of the first field-sustaining element connected in series with the cancellation winding of the second field-sustaining element, a second circuit including the input winding of the second field-sustaining element connected in series with the cancellation winding of the first field-sustaining element, means for buffering the outputs of said two output windings to a common field-sustaining element, and means including said cancellation windings in said first and second circuits for registering in said common field-sustaining element a signal transmitted by either of said circuits, only when said signal transmitting circuit is acting exclusively of the other.

3. In a signal control system, a pair of signal storing elements, a first conducting means for entering a signal in the first of said elements, a second conducting means for entering a signal in the second of said elements, a third conducting means connected in series with said first conducting means for inhibiting the entrance of a signal in the second of said elements, a fourth conducting means connected in series with said second conducting means for inhibiting the entrance of a signal in said first of said elements, and means for registering the operation of either of said first or second conducting means only when such operation occurs exclusively of operation of the other of said first or second conducting means.

4. A device for registering a partial algebraic sum comprising a pair of signal storing elements, an output circuit, input windings for entering digital values in each of said signal storing elements, means responsive to energization of one of said input windings for producing in said output circuit a signal representing the partial algebraic sum constituted by the entered digital value, and cancellation windings cross-connected in series with said input windings responsive to simultaneous energization of both said input windings for preventing production of a signal in said output circuit, the cancellation of said entering digital values preventing any change in said signal storing elements.

5. A device for registering a partial algebraic sum comprising a pair of signal storing elements, an output circuit, input winding means for entering digital values in each of said signal storing elements, means responsive to operation of one of said input winding means for producing in said output circuit a signal representing the partial algebraic sum constituted by the entered digital value, and cross-inhibiting means including a cancellation winding connected in series with each of said input winding means responsive to operation of both said input winding means for preventing any change in said signal storing element and production of a signal in said output circuit.

6. In a signal control system, a pair of field-sustaining signal storing elements, an output circuit, means including input windings on said elements for entering digital values in each of said signal storing elements means including cancellation windings cross-connected in series with said input windings for inhibiting simultaneous input signals from entering said signal storing elements, said latter means responsive to current flow in one, but not both, said input windings, to produce a signal in said output circuit.

7. In a signal control system, a pair of field-sustaining signal storing elements, an output circuit, means including input windings on said elements for reversing the polar direction of their respective fields, means including cancellation windings cross-connected in series with said input windings for inhibiting simultaneous input signals from entering said signal storing elements said latter means responsive to current flow in one, but not both, said input windings, to produce a signal in said output circuit.

8. In a signal control system, a pair of field-sustaining signal storing elements, an output circuit, means including input windings on said elements for reversing the polar direction of their respective fields, means including cancellation windings cross-connected in series with said input windings for inhibiting simultaneous input signals from entering said signal storing elements and means including output windings on said elements for generating a signal in said output circuit in response to current flow in one, but not both, of said input windings.

9. In a signal control system, a pair of field-sustaining elements, means including input windings on said elements for reversing the polar direction of their respective fields, means for energizing said input windings, a cancellation winding connected in series with each of said input windings for rendering either one of said direction reversing means ineffective to produce a change in the respective field-sustaining element when the other input winding is activated by said energizing means.

10. In a signal control system, a pair of field-sustaining elements, means including input windings on said elements for reversing the polar direction of their respective fields, means including preceding field-sustaining elements for energizing said input windings, and an inhibit winding of opposite polarizing effect connected in series with each of said input windings for rendering either one of said direction reversing means ineffective to change said field-sustaining element when the other input winding is activated by said energizing means, and an additional inhibit winding in series with one of said inhibit windings connected in circuit wth a precedng field-sustaining element for inhibiting operation of said first-recited means.

References Cited in the file of this patent

UNITED STATES PATENTS

| | | |
|---|---|---|
| 2,610,790 | Elliott | Sept. 16, 1952 |
| 2,695,993 | Haynes | Nov. 30, 1954 |
| 2,696,347 | Lo | Dec. 7, 1954 |
| 2,715,997 | Hill | Aug. 23, 1955 |
| 2,719,773 | Karnaugh | Oct. 4, 1955 |

Notice of Adverse Decision in Interference

In Interference No. 90,807 involving Patent No. 2,852,699, S. Ruhman, Magnetic core gating circuits, final decision adverse to the patentee was rendered July 8, 1963, as to claims 1, 2, 3, 4, 5, 6, 7, 8 and 9.

[*Official Gazette September 3, 1963.*]